United States Patent
Billeter

[15] 3,637,054
[45] Jan. 25, 1972

[54] PNEUMATIC-HYDRAULIC BRAKING SYSTEM FOR RAILWAY CARS

[72] Inventor: Henry R. Billeter, Deerfield, Ill.
[73] Assignee: Sloan Valve Company, Chicago, Ill.
[22] Filed: Mar. 23, 1970
[21] Appl. No.: 21,769

[52] U.S. Cl. ...................... 188/195, 60/54.5 S, 188/196 A, 303/23
[51] Int. Cl. .............................................. B60t 8/18
[58] Field of Search ............................ 60/54.5–54.65; 188/153, 195, 196 A; 303/23

[56] References Cited

UNITED STATES PATENTS

| | | | |
|---|---|---|---|
| 1,673,528 | 6/1928 | Pigeolet | 188/196 A UX |
| 2,010,273 | 8/1935 | Pieper | 188/196 A |
| 2,924,945 | 2/1960 | Oswalt | 188/196 A X |
| 2,972,865 | 2/1961 | Orshansky | 188/196 A X |

*Primary Examiner*—Duane A. Reger
*Attorney*—Parker, Carter & Markey

[57] ABSTRACT

In this braking system the airbrake cylinder on the railroad car actuates a master hydraulic cylinder connected to hydraulic-operated truck cylinders to operate the wheel brakes. Provisions are made for replenishing the hydraulic fluid in the system and an automatic hydraulic slack adjuster together with an empty and load-compensating arrangement is included in one unitary structure.

24 Claims, 2 Drawing Figures

INVENTOR.
HENRY R. BILLETER
BY
PARKER, CARTER & MARKEY
ATTORNEYS

PNEUMATIC-HYDRAULIC BRAKING SYSTEM FOR RAILWAY CARS

BACKGROUND OF THE INVENTION

Almost all railroad freight cars presently in operation employ a braking system utilizing extensive mechanical linkages between the airbrake cylinder and the brakeshoes. This type of mechanical braking arrangement is relatively heavy and cumbersome in that it incorporates a number of large levers, rods, brackets and assorted rigging, all of which contribute to undesirable forces, weights and stresses in the wheel trucks and car body. When certain desirable features are added to such a mechanical brake system, including slack adjusters, empty and load equipment, etc., the extra equipment introduces problems of clearance and space for installation as well as service and maintenance considerations. The use of mechanical brake linkage also introduces an eccentric load upon the truck or bolsters of the freight car which tends to twist the bolster and cant the car wheels thereby contributing to excessive wear and danger of damage.

It is an object of the invention, therefore, to eliminate the foregoing disadvantages by providing a braking system combining both pneumatic and hydraulic operated equipment. This combination arrangement also functions in a manner to reduce friction and improve efficiencies of the braking system. Simplified maintenance is also possible because only one size hydraulic truck cylinder is used for all railroad cars. The hydraulic master cylinder is preferably sized to suit the car weight and brakeshoe type.

SUMMARY OF THE INVENTION

The braking system of the invention utilizes the conventional airbrake cylinder connected to the airbrake system through the AB control valve and the air reservoir of the freight car. Coupled to the airbrake cylinder is a master hydraulic cylinder and associated piston together with a casing constituting a reservoir for the hydraulic fluid and containing a number of check valves controlling the flow of fluid between the hydraulic cylinder and piston. An automatic hydraulic slack adjuster is associated with the hydraulic piston unit and is connected to individual truck wheel cylinders for actuating the brakes. Associated with the pneumatic and hydraulic piston and cylinder is an empty and load arrangement for controlling the braking action on the wheels depending upon the weight of the lading carried by the freight car.

BRIEF DESCRIPTION OF THE DRAWINGS

The drawings illustrate the invention in schematic form and are not to be construed to show any precise embodiment, but only to depict the principles of the invention as described.

DESCRIPTION OF THE PREFERRED EMBODIMENT

Figure 1:
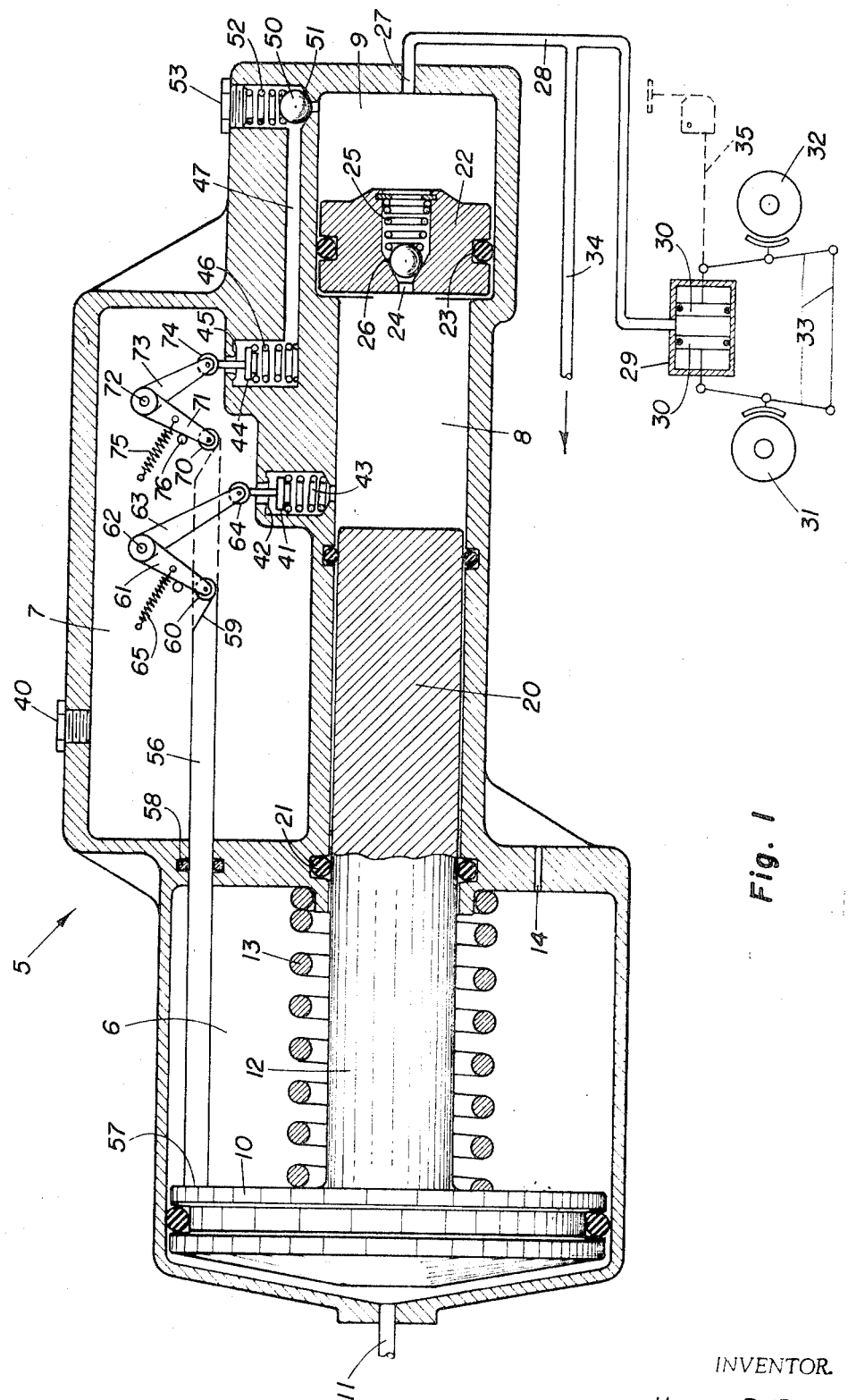
FIG. 1 is a cross-sectional view of a casing diagrammatically showing internal elements of the invention.

Referring now specifically to FIG. 1, a suitably designed outer casing indicated generally at 5 is supported upon the car frame in any manner and encloses a plurality of separate chambers combined as a single unit in the casing and connected together as shown. The chamber 6 comprises the airbrake cylinder chamber; the chamber 7 the hydraulic fluid reservoir; the chamber 8 the hydraulic cylinder chamber, and chamber 9 constitutes the hydraulic slack adjuster chamber. Operable within the airbrake cylinder chamber 6 is the usual airbrake piston 10 subject to air pressure on one side from the airbrake pipeline 11, which is in turn connected to the usual AB brake control valve (not shown) and the air reservoir on the freight car. The various portions of the airbrake cylinder may be of standard type and includes the usual push rod 12 and restoring spring 13. The opposite side of the piston 10 is relieved to atmosphere through opening 14 in the wall of casing 5.

Formed integral with and on the forward end of the push rod 12 is a hydraulic piston 20 extending into slidable engagement with the hydraulic chamber 8. An O-ring 21 in the casing partition around push rod 12 effectively seals the airbrake chamber 6 from the hydraulic chamber 8 so that only air pressures are present in brake cylinder chamber 6 and only hydraulic brake fluid is present in chamber 8. The hydraulic piston 20 is adapted to slide back and forth in chamber 8 under control of the push rod 12. Located within chamber 9 is the hydraulic slack adjuster piston 22 having the O-ring packing seal 23 around it to seal off chamber 8 from chamber 9 while permitting independent slidable movement of the piston 22 within the chamber 9.

Centrally positioned within and carried by the slack adjuster piston 22 is a check valve allowing flow from chambers 8 to 9 and which may be of any suitable type such as the ball check 24 normally spring pressed by spring 25 to its seat 26, which spring is strong enough to overcome the friction of the piston seal 23. The outer sidewall portion of chamber 9 has a conduit connection at 27 with a flexible conduit or hose connection 28 and this in turn with the wheel cylinder casing 29 containing oppositely disposed wheel hydraulic pistons 30. The hydraulic conduit connection 28 is attached to the casing 29 at a point between the two pistons 30, as shown, so that hydraulic pressures from the conduit connection 28 and in casing 29 is effective to force the pistons 30 apart and outward for braking application. The hydraulic pistons 30 are each connected to a separate set of car wheels 31 and 32 by the usual truck levers such as 33 for application of the brakes in the regular manner. Any similar or well-known brakeshoe applying arrangement may be used in this connection; for example, that shown in U.S. Pat. No. 2,511,336 issued June 13, 1950. The branch line 34 of the hydraulic connection 28 may lead to another similar hydraulic cylinder and pistons on another truck for the wheels thereof, and operated simultaneously with the braking action on the first mentioned set of wheels. A handbrake-operating connection generally indicated at 35 may be made to one of the truck levers 33 in any suitable manner.

Referring now to the closed reservoir chamber 7, this is filled with a suitable hydraulic liquid such as oil through the opening closed by filler cap 40. This brake fluid also flows by gravity into chamber 8 in front of the hydraulic piston 20, by way of a passage through the normally held open check valve 41 connecting the two chambers. This check valve 41 is urged to its seat 42 by the spring 43. A second check valve 44 is held open and urged to its seat 45 by the spring 46 and controls one end of a passage 47 leading from the reservoir chamber 7 to the slack adjuster chamber 9. A third ball-type check valve 50 in the other end of passage 47 is normally pressed to its seat 51 by spring 52. The screwplug 53 enables the check valve so to be assembled in the wall of casing 5 when the plug 53 is removed.

The check valves 41 and 44 are each controlled in a separate manner by the operation of the brake cylinder piston 10. An operating rod 56 is attached at one end 57 to an edge portion of the brake cylinder piston 10 in suitable manner so that each time the piston 10 is operated the rod 56 is projected forward in the reservoir chamber 7. An O-ring seal 58 in the partition wall of casing 5 isolates the airbrake cylinder chamber 6 from the brake fluid reservoir 7 while permitting reciprocating movement of the rod 56. The opposite end of the operating rod 56 is formed with a taper 59, as shown, which is normally positioned adjacent a roller 60 in turn supported on the end of one arm 61 of a compound lever, the midpoint of which is pivoted on a shaft 62 in the sidewall of casing 5. The other arm 63 also has a roller 64 at its end which normally engages the operating stem of check valve 41 and holds the valve open from its seat 42. A spring 65 attached to the compound lever arm 61 normally holds the arms and rollers 60 and 64 in the positions as illustrated.

A second similar compound lever pivoted on a shaft 72 has one roller 70 journaled on the end of arm 71 and positioned in the path of the tapered end 59 of operating rod 56 to be engaged by the rod when the movement of the rod has reached about 8 inches, the permissive movement of the airbrake cylinder piston 10 according to railroad regulations. The other arm 73 of the compound lever has its roller 74 normally engaging the operating stem of check valve 44 thereby holding it open from its seat 45. A spring 75 holds the arm 71 against a stop 76.

The mechanism and associated braking elements are shown in the drawings as being in the normal brakes released position or that in which the freight car is running in transit. In this condition the reservoir chamber 7 will be filled with hydraulic brake fluid as well as the hydraulic piston chamber 8 and the slack adjuster chamber 9. When a braking action takes place in the usual manner, air pressure is built up in the airbrake cylinder line 11 which results in the airbrake cylinder piston 10 being forced forward in the brake cylinder chamber 6. The push rod 12 is thereby projected forward and along with it the hydraulic piston 20. At the same time the operating rod 56 attached to the brake cylinder piston 10 moves with it and engages its tapered right end 59 with roller 60 of the lever arm 61, thereby shifting arm 63 and its roller 64 out of engagement with the stem of check valve 41. As a result check valve 41 immediately closes upon its seat 42 to trap the hydraulic brake fluid in chamber 8. The hydraulic piston 20 is now effective to exert its full force on the trapped brake fluid in chamber 8 and against the slack adjuster piston 22, which piston is thereby projected forward in chamber 9 to force the brake fluid therein through the hydraulic flexible hose connection 28 to the braking elements. As the airbrake piston 10 further advances, the operating rod 56 will eventually engage its cam end 59 with roller 70 of lever arm 71. This in turn results in roller 74 on lever arm 73 disengaging from the check valve stem allowing closing of check valve 44 on its seat 45. The hydraulic fluid in reservoir chamber 7 is now prevented from flowing through both passages leading into the hydraulic chamber 8 and slack adjuster chamber 9 trapping the fluid therein. As is seen upon every brake application made, the check valves 41 and 44 are closed. The brake fluid pressure build up in the flexible hose connection 28 exerts itself within the wheel cylinder 29 causing the pistons 30 to be forced apart and the wheel levers 33 to force the brakeshoes to engage the wheels 31 and 32. The branch hydraulic hose connection 34 is also effective to activate the brakes on other sets of wheels, not shown, on the freight car. Under the foregoing conditions it is assumed that the brakeshoes are not worn down too much or that new shoes have not been installed. The stroke of the hydraulic piston 20 and the movement of the slack adjuster piston 22 will be such as to traverse almost the full length of their respective chambers since the brake fluid in these chambers will be displaced accordingly in this normal braking operation under the conditions pointed out.

Now when the brakes are released by exhausting the air pressure in reservoir brake pipe 11, the brake cylinder piston 10 is restored under the influence of its restoring spring 13, carrying along with it the hydraulic piston 20 and the operating rod 56. Near the end of the restoring movement of piston 10, the rod end 59 permits the bellcrank arm 63 to again engage its roller 64 with the check valve stem 41 to open it from its seat 42. Any excess brake fluid in chamber 8 can then flow back into reservoir chamber 7 or be replenished from that chamber as the hydraulic piston 20 moves back to normal. The hydraulic slack adjuster piston 22 also is shifted back to its normal position by the reverse flow of brake fluid in the hose connection 28 caused by the restoration of the wheel pistons 30 when pressure is released in wheel cylinder 29. The weight of the brake beams and brakeshoes in releasing results in this action under normal operating conditions.

The proportions and capacity of the hydraulic chamber 8 and slack adjuster chamber 9 together with the effective area of the pistons 20 and 22 are such that under normal braking conditions and with brakeshoes not appreciatively worn, the foregoing action takes place.

As wear takes place in the brakeshoes it will be obvious that this excess slack condition must be compensated for to provide for the most efficient braking action, and according to the invention this is accomplished automatically under control of the slack adjuster piston 22, as will now be pointed out. Because of the excessive wear in the brakeshoes, which must not exceed 8 inches travel of the brake cylinder piston according to the Association of American Railroad Rules, the brake cylinder piston 10 is projected forward in the brake cylinder chamber 6 and the operating rod 56 accordingly shifted in the reservoir chamber 7 to initially trip the lever arm 61 to permit closure of check valve 41, and secondly the rod end 59 engages the lever arm 71 to allow the check valve 44 to close. Flow of brake fluid back into or out of the reservoir chamber 7 is accordingly prevented by both check valves being closed. The extended movement of hydraulic piston 20 results in build up of pressure in hydraulic chamber 8 and the consequent forcing of slack adjuster piston 22 further along in chamber 9. The brake fluid in chamber 9 is forced through hose connection 28 to operate the wheel cylinders 30 and apply the braking force to the wheels. Since there is too much wear in the brakeshoes, the piston 22 will engage the end wall of the casing 5 and then stop. However, the hydraulic piston 20 continues to move forward in chamber 8 forcing the fluid past check valve 24 to overcome the tension of spring 25 thereby forcing the ball check valve 24 off of its seat 26. This additional fluid pressure results in taking up the wear in the brakeshoes and firmly applying the new brakeshoes to the wheels.

Upon the subsequent brake release action, brake fluid pressure in the chamber 8 is reduced enabling the slack adjuster piston 22 to shift back to normal position by the returning fluid when its ball check valve 24 closes. The excess or additional amount of brake fluid now in chamber 9 and forced back into the chamber as the wheel pistons 30 are restored to release the brakeshoes, remains in chamber 9 so that upon the next brake application the brakes are efficiently applied and the stroke of the airbrake piston 10 will be within the allowable limits, and the wear of the brakeshoes is compensated for.

Assume now the condition in which the brakeshoes are too tight, which would ordinarily be the case where new brakeshoes are installed, and in order to prevent locked wheels or skidding when braking action is initiated, some slack must be introduced or let out. Under this condition the brake cylinder piston 11 is actuated as usual to project the hydraulic piston 20 into chamber 8. Check valve 41 is immediately closed by action of operating rod 56 so that the brake fluid is trapped in chamber 8. However, since the brakeshoes are "tight" the air piston 10 and hydraulic piston 22 are shifted very little at first since the brake fluid in chamber 9 immediately builds up pressure in hose connection 28, to apply the brakes. As the airbrake cylinder piston 10 further advances, more pressure buildup takes place in chamber 8 and the slack adjuster piston 22 is moved until it engages the wall of the casing 5. After the brakes are applied the additional buildup of pressure by piston 22 in chamber 9 eventually reaches a value where the ball check valve 51 is opened from its seat 51 against the tension of spring 52 (about 200 lbs.). When this occurs the brake fluid flows from the chamber 9 through the check valve 50 and passage 47, through the open check valve 44, and into the reservoir chamber 7, thus relieving the pressure upon the brakeshoes to a point where they no longer lock the brakes. The check valve 44 is open at this time because the cam 59 of operating rod has not yet been pushed forward far enough to trip the lever arm 73 and roller 74 out of engagement with the stem of check valve 44.

Upon brake release action the slack adjuster piston 22 restores as usual, the return fluid in conduit 28 and wheel cylinder 29 effecting this action. The check valve 50 closes, trapping the brake fluid in chamber 9 so that upon subsequent brake application the piston 22 will be moved to provide for the normal movement of the brakeshoes against the wheels. It will be noted that during the foregoing action (tight brakes) the check valve 24 remained seated by the pressure in chamber 9.

From the foregoing it is seen that the invention automatically compensates for brakeshoe wear or when new shoes are installed, so that the braking force will always be the same, the action of the slack adjuster piston 22 adjusting the force through the medium of the hydraulic fluid. The airbrake piston in all instances is operated not more than the full stroke as required by the railroad regulations.

DESCRIPTION OF THE MODIFIED EMBODIMENT

Figure 2:
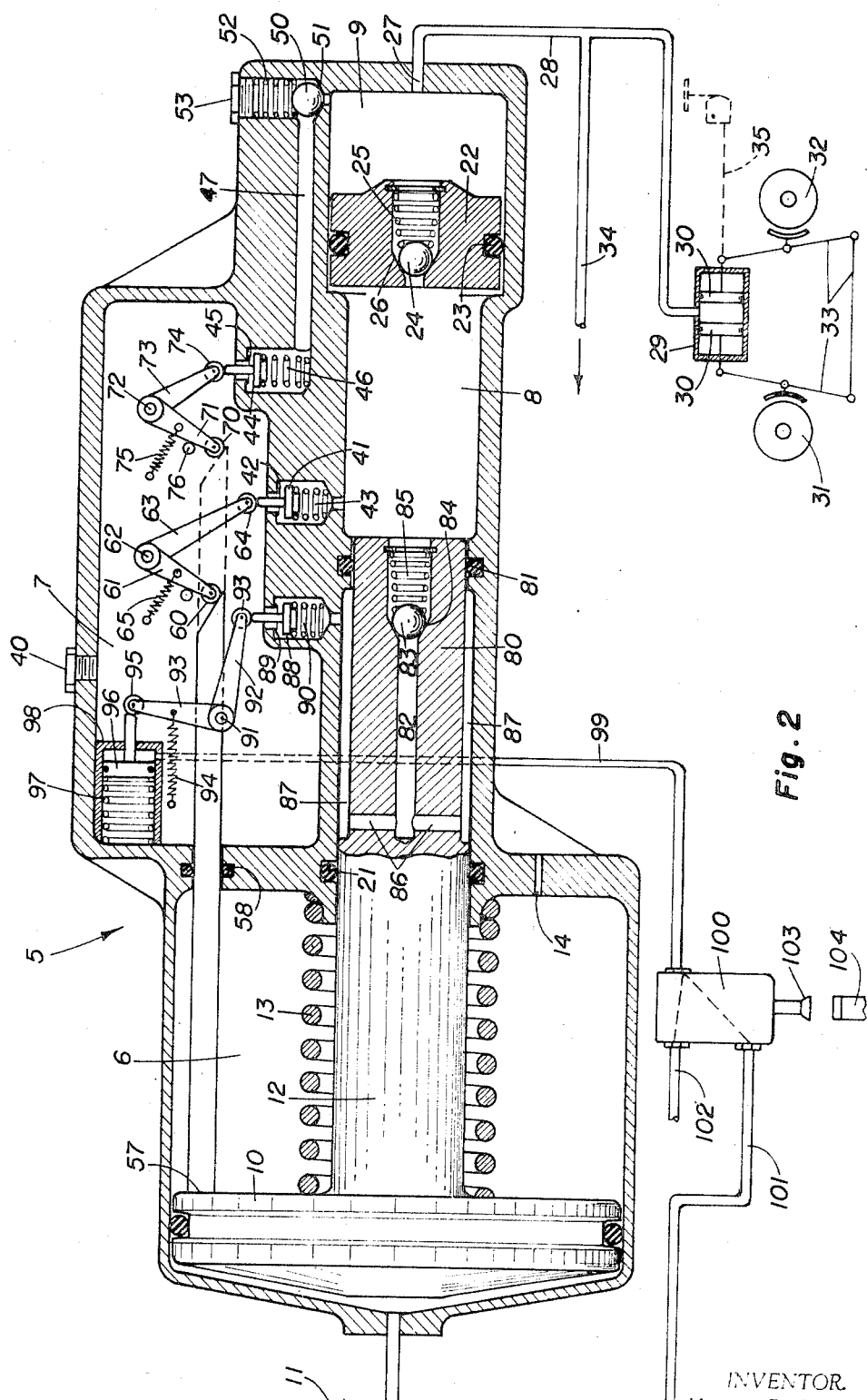
FIG. 2 is a cross-sectional view of a casing similar to FIG. 1 but including an associated empty and load arrangement.

Referring now to the modification of the invention illustrated in FIG. 2, this incorporates the feature of empty and load control into the mechanism and arrangement shown and described in FIG. 1, and therefor similar elements are designated with the same reference characters and cooperate in the same manner. This hydraulic-pneumatic system is arranged to automatically apply greater braking pressure upon the brakes of a loaded car rather than upon an empty or lightly loaded car.

Part of the empty-load equipment includes the modified hydraulic piston 80 attached to and integral with the end of the push rod 12 of the airbrake piston 10. An O-ring seal 81 surrounds the end of piston 80 in the hydraulic chamber 8, and a fluid passage 82 extends axially through the piston 80 and at the right-hand end is closed off by a ball check valve 83 normally resting on its valve seat 84 under control of the spring 85. The opposite end of passage 82 leads into side passages 86 and these into the chamber 87 or the space around the piston 80 in the cylinder in which it slides. Located at the right-hand end of the chamber 87 and controlling the passage of brake fluid from reservoir 7 to chamber 87 is a control check valve 88 normally urged towards its seat 89 by spring 90. This check valve 88 is held open by a pivoted bellcrank lever 91 having one arm 92, the end of which has a roller 93 on it, normally engaging the stem of check valve 88. Brake fluid from the reservoir chamber 7 can flow freely by gravity through the control valve 88 to the chamber 87. The other arm 93 of bellcrank lever 91 is provided with a roller 95 normally pressing against the stem of a piston 96 by action of the spring 94. A somewhat stronger spring 97 presses against the other side of the piston 96 and through the bellcrank 91 holds the check valve 88 in the open position as shown. The piston 96 and spring 97 are operable within a sealed casing 98 suitably supported within the reservoir 7. The casing 98 has a flexible airhose or conduit connection 99 leading from the front side of piston 96. The other end of conduit connection 99 is attached to a load-sensing unit 100 supported upon the railway car bolster.

This load-sensing device 100 may be of any well-known construction, such as shown in U.S. Pat. No. 3,291,265 issued Dec. 13, 1966. It comprises generally a casing with a conduit connection 101 leading to the airbrake pipe connection 11. Another conduit connection 102 leads to exhaust. Included within the sensing device 100 is a strut piston (not shown) having an operating stem 103 arranged in opposed relationship to a fixed stop 104 on the car frame. When the freight car is heavily loaded the strut 103 of sensing device 100 engages the stop 104 and the piston within the device establishes the through connection between the airhose conduit connection 99 and 102, while in the empty car condition the connection 99 extends to the airbrake pipe connection 101.

In the ordinary operation of the freight car carrying a relatively light load, or no load, the sensing device 100 will not be operated so that the conduit connection 99 will be connected through to the brake pipeline 101 with the result that the piston 96 is not initially shifted and check valve 88 remains open until a brake application is made and brake pipes 11 and 101 are charged. When a brake application is now made under the above assumed "no load" conditions, the brake cylinder piston 10 operates its push rod 12 and this in turn forces the hydraulic piston 80 into the hydraulic chamber 8. At the same time air pressure in conduit 101 and 99 operates control piston 96 causing check valve 88 to close on its seat. As the piston 80 continues to advance, the hydraulic fluid in chamber 87 is forced through passages 86 and 82 by the shoulder around the rear end of the piston 80 as it approaches the O-ring seal 81. The continued movement of piston 80 eventually builds up sufficient pressure in passage 82 to force the piston check valve 83 off of its seat 84, allowing the brake fluid to pass into hydraulic chamber 8, thereby increasing the amount therein. This is effective to produce a light brake application since the effective area of the hydraulic piston 80 is decreased and the hydraulic pressure is reduced from the given air pressure.

The remaining steps in the braking operation take place as piston 80 advances and occurs in the same manner as has been previously described in connection with FIG. 1; the brakes being applied through the hydraulic connection, and slack take up or let out under control of the slack adjuster piston 22 and associated check valves, as before. Responsive to brake release the parts are restored to normal and as piston 80 retracts the brake fluid in chamber 87 is replenished from reservoir chamber 7 through the check valve 88 when it opens and the airbrake pressure is released in airbrake pipe 11.

Assume now that the freight car is heavily loaded, then the sensing device 100 is shifted downward so that strut 103 engages the stop 104. As a result the piston in the sensing unit 100 transfers the connection from exhaust conduit 102 to the flexible connection 99. The conduit connection 99 in this case is not charged with airbrake pressure and piston 96 is not forced inward in its casing 98 against the force of spring 97 but remains in the position shown. Control check valve 88 accordingly remains open and the brake fluid in chamber 87 around piston 80 and in the passages 82 and 86 is free to flow back into reservoir 7 unimpeded. Under the assumed "loaded" condition, a brake application now results in airbrake piston 10 projecting the hydraulic piston 80 forward into chamber 8.

As the piston 80 progressively moves forward in chamber 8, the brake fluid in chamber 87 is forced out through the control check valve 88 as the shoulder of piston 80 approaches the O-ring seal 81. The ball check valve 83 is not moved off of its seat in this case so the full area of the piston face is effective on the brake fluid trapped in chamber 8. The effective pressure area of the piston 80 is considerably increased thereby increasing the hydraulic pressure in chamber 8 from a given air pressure in the airbrake cylinder 6. The slack adjuster piston 22 is thereby operated forward in chamber 9 until it engages the end wall of the casing whereupon it is stopped. As the fluid pressure in chamber 8 further builds up a pressure value is reached to force open the ball check valve 24 from its seat 26 in the piston 22. Fluid pressure will accordingly be effective over hydraulic conduit connection 28 to the wheel pistons 30 and cause application of braking pressure to the brakeshoes. This brake application will be with much greater force upon the wheels at this time than when the car was empty or lightly loaded.

Upon brake release the air pressure in airbrake pipe 11 is reduced to restore the brake cylinder piston 10 and hydraulic piston 80 recedes so brake fluid is again equalized between the reservoir chamber 7 and the chamber 8. The slack adjuster piston 22 also is forced back due to the reverse fluid pressure in hydraulic conduit connection 28 caused by the gravity restoring movement of the brakeshoes, brake beams and short brake levers. Under any of the foregoing conditions the empty-load operation will in no way interfere with the operation of the equipment when there is excessive wear on the brakeshoes or new shoes have been installed. The action is the same as has been pointed out heretofore. Likewise the operation of the slack-adjusting feature of the equipment does not interfere with the empty-load arrangement when the freight car is in either condition.

From the foregoing description and operation it will be apparent that in place of the conventional airbrake cylinder, a braking arrangement employing an air-hydraulic braking cylinder is employed where the energy force from the airbrake cylinder is transmitted directly to the hydraulic cylinder, and then through flexible conduit connections to the wheel cylinders. Incorporated in the braking mechanism is both a hydraulic slack adjuster as well as an empty-load arrangement. The usual large number of heavy levers, the rods, rigging, mechanical slack adjuster and associated equipment is entirely eliminated, reducing costs and maintenance problems. All other air-braking apparatus associated with the railway car such as the airbrake pipeline, air reservoirs, AB control valve, etc., remains unchanged.

What is claimed is:

1. In a brake system for railroad cars, a housing having a plurality of chambers, an air inlet into one chamber, a piston in said one chamber, spring return means in said one chamber, air from said inlet and said spring means being effective to move said piston back and forth in said one chamber,
one of said chambers being a fluid reservoir, a valve-controlled fluid passage from said reservoir to a third chamber, a piston movable in said third chamber,
fluid means for applying a braking force to the car wheels, a fluid passage between said third chamber and said fluid means,
means for imparting force from movement of said air-operated piston to said fluid piston movable in said third chamber to apply a braking force to the wheels,
and means operable by said air-operated piston for adjusting the fluid in said third chamber to provide generally uniform travel of said air-operated piston during brake application.

2. The structure of claim 1 further characterized by and including a third piston, connected to said air piston, and movable in a fourth chamber, a fluid passage between said fourth chamber and said reservoir and valve means controlling said passage, movement of said third piston being effective to cause movement of said fluid piston to cause application of the brakes.

3. In a brake system for railroad cars, an air cylinder, piston means within said air cylinder, with said piston means moving in response to an application of brakes,
fluid means for applying the air cylinder piston force to the car wheels,
and fluid means for compensating for the condition of the brakeshoe to provide generally uniform travel of the air cylinder piston, including a chamber, a fluid piston movable in said chamber, a conduit between said chamber and said fluid means for applying force to the car wheels, and valve means controlling the supply of fluid in said chamber, and means, operable by movement of said air cylinder piston for controlling said valve means.

4. In a pneumatic-hydraulic braking system for a railway car, a unitary casing having a plurality of chambers therein comprising an airbrake chamber, a hydraulic chamber, and a slack adjuster chamber, a separate piston operable in each of said chambers, the hydraulic piston being attached to and operable with said airbrake piston, a fluid-filled reservoir chamber connected to fluid passages in said casing leading into said hydraulic chamber and into said slack adjuster chamber to replenish the fluid supply in said chambers, normally open check valves in each of said fluid passages, a hydraulic wheel cylinder having pistons therein connected to the car brakeshoes, a flexible conduit connection between said slack adjuster chamber and said wheel cylinder, the application of braking power to said airbrake piston being effective to operate said hydraulic piston to build up fluid pressure in said hydraulic chamber and this in turn to operate said slack adjuster piston to build up fluid pressure in said slack adjuster chamber, the fluid pressure from said slack adjuster chamber being effective through said flexible conduit connection to actuate said wheel cylinder pistons and apply braking force to the brakeshoes, and means controlled by said slack adjuster piston for automatically compensating for abnormal slack conditions between the car brakeshoes and wheels.

5. The pneumatic-hydraulic braking system as defined in claim 4 in which the means controlled by the slack adjuster for compensating for abnormal slack conditions includes a normally closed check valve supported on said slack adjuster piston.

6. The pneumatic-hydraulic braking system as defined in claim 4 in which the flexible conduit connection between the slack adjuster chamber and the wheel cylinder has a branch connection leading to other wheel cylinders on the railway car.

7. In a pneumatic-hydraulic braking system for railway cars, a casing having an airbrake chamber, a hydraulic chamber and a slack adjuster chamber therein, a separate piston in each of said chambers, the hydraulic chamber piston being attached to said airbrake piston, a fluid-filled reservoir chamber in said casing, fluid passages in said casing connecting said reservoir chamber with said hydraulic chamber and with said slack adjuster chamber, a normally open check valve in each of said fluid passages, a hydraulic wheel cylinder having pistons therein operatively connected to the brakeshoes on the car wheels, a flexible conduit connection between said slack adjuster chamber and said wheel cylinder, the application of brake power to said airbrake piston resulting in the operation of said airbrake piston, said hydraulic piston and said slack adjuster piston, whereby said wheel pistons are actuated to apply the brakes to the wheels, and means controlled by said airbrake piston for operating said check valves to close the fluid passages to control the extent of movement of said slack adjuster piston.

8. In a pneumatic-hydraulic braking system for railway cars, a casing having a plurality of chambers therein including an airbrake cylinder chamber, a hydraulic fluid chamber and a slack adjuster chamber, a separate piston in each of said chambers, the hydraulic chamber piston being controlled by and attached to said airbrake chamber piston, the slack adjuster piston being fluid pressure operated in its associated chamber, a fluid-filled reservoir in said casing, said casing having a fluid passage therein connecting said fluid reservoir with said hydraulic chamber and another passage connected with said slack adjuster chamber, a first check valve in the passage between said reservoir and said hydraulic chamber, a second check valve in the passage between said reservoir and said slack adjuster passage, means attached to said airbrake piston and operative therewith for controlling said first and second check valves to close said fluid passages, to enable build up of fluid pressures first within the hydraulic chamber and then said slack adjuster chamber, a wheel cylinder and piston therein for operatively applying the car brakeshoes to the car wheels, and a flexible conduit connection extending between said slack adjuster chamber and said wheel cylinder for conveying the fluid pressures built up in said slack adjuster chamber to said wheel cylinder to operate the brakeshoes.

9. The pneumatic-hydraulic braking system as defined in claim 8 in which the check valves are directly operated by compound levers having lever arms operated by the movement of the control means attached to said airbrake piston.

10. In a pneumatic-hydraulic braking system for railway cars, a casing on said car including an airbrake cylinder having a piston therein, a hydraulic cylinder having a piston therein attached to and movable with said airbrake piston, a slack adjuster cylinder having a piston therein, a fluid-filled reservoir having a passage leading into said hydraulic cylinder and a second passage leading into said slack adjuster cylinder, a check valve in each of said passages, separate bellcrank levers for controlling the opening and closing of said check valves, an operating rod attached to said airbrake piston and extending into said reservoir into operable and sequential engagement with said bellcrank levers, a check valve in said slack adjuster piston, a second check valve in said passage between said fluid reservoir and said slack adjuster cylinder, a wheel cylinder separate from said casing having pistons therein attached to the car brakeshoes, and a flexible conduit connection between said wheel cylinder and said slack adjuster cylinder, whereby upon a brake application said airbrake piston actuates said hydraulic piston to build up fluid pressure in said hydraulic cylinder to thereby actuate said slack adjuster piston in said slack adjuster cylinder, the fluid pressure build up in said slack adjuster cylinder being effective over said conduit connection to actuate the wheel cylinder pistons and apply the braking action, the check valve in said hydraulic piston and the second check valve in the passage from the reservoir to the slack adjuster cylinder being effective to control the extent of movement of said slack adjuster piston and thereby compensate for abnormal slack conditions between the brakeshoes and the wheels of the railway car.

11. The pneumatic-hydraulic braking system for railway cars as defined in claim 10 in which the check valves in the passages between the fluid reservoir and the hydraulic cylinder and the slack adjuster cylinder in their open position permit replenishing of the brake fluid in said cylinder.

12. The pneumatic-hydraulic braking system for railway cars as defined in claim 10 in which both check valves in the reservoir passages are normally held open by the associated bellcrank levers and are spring closed when the operating rod on the airbrake piston engages the bellcrank levers, the first bellcrank lever being operated at the beginning of the movement of the airbrake piston and the second bellcrank lever at the end of the airbrake piston movement.

13. The pneumatic-hydraulic braking system for railway cars as defined in claim 10 in which the slack adjuster piston is operated each time the full distance across its cylinder under normal brakeshoe wear conditions, whereas when new brakeshoes are installed the piston operates only part way in its cylinder and the built up pressure in the slack adjuster cylinder is relieved into the reservoir by the pressure opening of the check valve in the passage leading from the slack adjuster cylinder into the reservoir.

14. The pneumatic-hydraulic braking system for railway cars as defined in claim 13 in which the slack adjuster piston is operated the full distance in its cylinder when the brakeshoes are abnormally worn down, whereby the check valve in the slack adjuster piston is pushed open from its seated position by the pressure of the fluid in the hydraulic chamber which is then transmitted to the conduit connection and the wheel cylinder to operate the worn brakeshoes against the car wheels.

15. In a pneumatic-hydraulic braking system for railway cars, a single unitary supporting casing having therein an airbrake cylinder and associated piston, a hydraulic cylinder and associated piston directly connected to said airbrake piston, a slack adjuster cylinder and associated piston, and a hydraulic fluid reservoir, a wheel cylinder separate from said supporting casing and having pistons therein connected to the railway car brakeshoes for actuating the same, a flexible conduit connection between said wheel cylinder and said slack-adjusting cylinder, said airbrake piston being responsive to airbrake application and effective to move said hydraulic piston into its associated cylinder to build up hydraulic pressure therein and thereby effect the movement of said slack adjuster piston in its associated cylinder, the movement of said slack-adjusting piston being effective to actuate the wheel cylinder pistons through said conduit connection to apply the brakes to the car wheels, means in said slack adjuster piston for compensating for wear in said brakeshoes or the installation of new brakeshoes, check valve means arranged in passages in said casing between said hydraulic cylinder and said reservoir and between said slack adjuster cylinder and said reservoir for controlling the action of said slack adjuster piston, means connecting said airbrake piston and said check valve means for controlling said check valves, and means for controlling the action of said hydraulic piston and the hydraulic pressure in said hydraulic cylinder in accordance with the empty or loaded condition of said railway car.

16. In a pneumatic-hydraulic braking system for railway cars, a unitary supporting casing having a plurality of cylinders and associated pistons therein including an airbrake piston, a hydraulic piston, and a slack-adjusting piston, a wheel cylinder having pistons therein connected to the brakeshoes of the railway car, a flexible conduit connection between said wheel cylinder and said slack adjuster cylinder, a braking operation on said car being effective to cause the actuation of said airbrake piston, airbrake piston then causing the operation of said hydraulic piston, said hydraulic piston then causing the operation of said slack adjuster piston, and said slack adjuster then causing the operation of said wheel cylinder pistons to apply braking force to the car wheels over said conduit connection, means controlled by said slack adjuster piston for automatically maintaining constant brakeshoe clearance with the car wheels as the brakeshoes wear or new shoes are installed, said hydraulic piston having a fluid passage extending therethrough and a check valve in said passage for controlling the effective area of said hydraulic piston in its cylinder, an empty- and load-sensing device on said car having a connection with the airbrake pipeline and another connection with said supporting casing, and means operated by said sensing device for controlling said hydraulic piston check valve in accordance with the empty or load condition of said railway car.

17. In a pneumatic-hydraulic braking system for railway cars, a single casing having a plurality of pistons therein operable in their associated cylinders, said pistons including an airbrake piston, a hydraulic piston, and a slack adjuster piston, said airbrake piston being operated responsive to a braking operation received over the airbrake pipeline of the railway car, said airbrake piston causing operation of said hydraulic piston, and said hydraulic piston causing operation of said slack-adjusting piston, a wheel cylinder and associated pistons therein separate from said casing, said wheel cylinder pistons being connected to the brakeshoes of said railway car, a flexible conduit connecting said wheel cylinder with said slack adjuster cylinder whereby the operation of said slack adjuster piston results in the application of the brakeshoes to the car wheels, means controlled by said slack adjuster piston for adjusting for brakeshoe wear, a fluid reservoir in said casing for supplying fluid to said hydraulic cylinder said slack adjuster cylinder and said wheel cylinder, check valve means in said casing controlling the flow of fluid between said hydraulic cylinder said slack adjuster cylinder from said reservoir, an empty- and load-sensing device on said railway car having a connection with the railway car airbrake pipeline, an auxiliary air cylinder and associated piston in said casing connected to said sensing device, a control check valve in said casing controlling fluid flow between said fluid reservoir and said hydraulic cylinder, means connecting said auxiliary air piston with said control check valve for controlling the same responsive to the empty or load condition of said sensing device, said control check valve being thereby effective to condition said hydraulic piston to apply more or less force to said slack adjuster piston and in accordance therewith to said brakeshoes.

18. In a pneumatic-hydraulic braking system for railway cars, a single casing having an airbrake piston and associated cylinder therein, a hydraulic piston connected to said airbrake piston and slidable in an associated cylinder in said casing, hydraulic slack-adjusting means connecting the brakeshoes of said railway car with said hydraulic cylinder whereby operation of said airbrake piston effects the operation of said hydraulic piston and this in turn said slack-adjusting means to produce a brake application, a fluid reservoir in said casing, a first check valve connecting said fluid reservoir with said hydraulic cylinder on one side of said hydraulic piston, a second check valve connecting said fluid reservoir with the other side of said hydraulic piston, an empty and load sensing device on said railway car having a connection with the airbrake pipeline of said car, an auxiliary air-operated piston and associated cylinder in said casing having an air pipe connection with said sensing device, operating means connecting said auxiliary piston with said second check valve, operating means connecting said airbrake piston with said first check valve, and means in said hydraulic piston operable depending upon the empty or load condition of said railway car as determined by the position of said sensing device for increasing or decreasing the effective operating pressure of said hydraulic piston in said hydraulic cylinder to increase or decrease the brake applying action upon the car brakeshoes.

19. The pneumatic-hydraulic braking system as defined in claim 18 in which the second check valve is actuated to open position when the sensing device indicates a loaded condition of the railway car whereby said hydraulic piston is rendered effective to apply its full force to the application of the brakes.

20. The pneumatic-hydraulic braking system as defined in claim 18 in which the second check valve is actuated to closed position when the sensing device indicates an empty condition of the railway car whereby said hydraulic piston is effective to apply a lesser force to the application of the brakes.

21. The pneumatic-hydraulic braking system as defined in claim 18 in which the second check valve is open when the sensing device indicates a loaded condition of the railway car whereby the hydraulic piston is effective to apply a relatively large force to the application of the brakes, whereas when an empty car condition is indicated the hydraulic piston applies a lesser force to the brakes.

22. The pneumatic-hydraulic braking system as defined in claim 18 in which the hydraulic piston is provided with a check valve normally closed when the hydraulic piston is operated under an empty car condition so that a reduced pressure area of the hydraulic piston is effective upon the slack adjuster piston and the car brakes, whereas the check valve is opened when the hydraulic piston is operated under a loaded car condition so that an increased pressure area of the hydraulic piston is effective to apply a greater braking force to the car brakes.

23. The pneumatic-hydraulic braking system as defined in claim 18 in which the hydraulic piston has a center passage therethrough with a check valve in the passage normally closing the same, said hydraulic piston also having a reduced front diameter extendable into a portion of its cylinder and a larger rear diameter extendable into another portion of said cylinder which is separated from said first cylinder portion by a sealing member through which said hydraulic piston is slidable, said piston having side passages therein connecting said center passage with said other cylinder portion, said second check valve in said casing having an opening into said other cylinder portion.

24. In a pneumatic-hydraulic braking system for railway cars, a casing having a hydraulic cylinder therein and a hydraulic piston operable in said cylinder, said hydraulic cylinder being divided into two separate portions, a sealing member separating said cylinder portions and through which said hydraulic piston is adapted to operate, a reduced diameter part of said hydraulic piston being operable in the first portion of said hydraulic cylinder and a larger diameter part of said hydraulic piston operable in the second portion of said hydraulic cylinder, a check valve in said hydraulic piston controlling a fluid passage through said hydraulic piston extending between the two portions of said hydraulic cylinder, a control valve in said casing controlling a passage between said second portion of said hydraulic cylinder and a source of fluid, an empty- and load-sensing device on said railway car, and means controlled by said sensing device for operating said control valve to control fluid flow through said second portion of said hydraulic cylinder and said piston passage into said first portion of said hydraulic cylinder.

* * * * *